US009366460B2

(12) United States Patent
Binek

(10) Patent No.: US 9,366,460 B2
(45) Date of Patent: Jun. 14, 2016

(54) REFRIGERATION THROUGH VOLTAGE-CONTROLLED ENTROPY CHANGE

(71) Applicant: Board of Regents of the University of Nebraska, Lincoln, NE (US)

(72) Inventor: Christian Binek, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 303 days.

(21) Appl. No.: 13/935,176

(22) Filed: Jul. 3, 2013

(65) Prior Publication Data

US 2014/0007592 A1 Jan. 9, 2014

Related U.S. Application Data

(60) Provisional application No. 61/667,472, filed on Jul. 3, 2012.

(51) Int. Cl.
*F25B 23/00* (2006.01)
*F25B 21/00* (2006.01)

(52) U.S. Cl.
CPC ......... *F25B 21/00* (2013.01); *F25B 2321/0023* (2013.01); *Y02B 30/66* (2013.01)

(58) Field of Classification Search
CPC . F25B 21/00; F25B 2321/0023; G01R 33/02; G01R 33/18; H01L 39/126; Y02B 30/66
See application file for complete search history.

(56) References Cited

U.S. PATENT DOCUMENTS

| 5,675,252 | A * | 10/1997 | Podney | 324/244 |
|---|---|---|---|---|
| 6,580,271 | B2 * | 6/2003 | Li et al. | 324/260 |
| 2004/0126620 | A1 * | 7/2004 | Viehland et al. | 428/692 |
| 2008/0211491 | A1 * | 9/2008 | Huang et al. | 324/209 |
| 2010/0175392 | A1 * | 7/2010 | Malloy et al. | 62/3.2 |
| 2011/0146308 | A1 * | 6/2011 | Casasanta | 62/113 |
| 2013/0067935 | A1 * | 3/2013 | Kruglick | 62/3.2 |

OTHER PUBLICATIONS

Angeloni et al., "Suppression of the metal-insulator transition temperature in thin $La_{0.7}Sr_{0.3}MnO_3$ films," *J. Appl. Phys.*, 2004, 96:6387.
Armstrong and Virkar, "Performance of Solid Oxide Fuel Cells with LSGM-LSM Composite Cathodes," *J. Electrochem. Soc.*, 2002, 149:A1565-A1571.
Belyea et al., "Magnetocaloric effect in epitaxial $La_{0.56}Sr_{0.44}MnO_3$ alloy and digital heterostructures," *J. Appl. Phys.*, 2012, 111:07A935 (3 pages).
Bohigas et al., "Room-temperature magnetic refrigerator using permanent magnets," *IEEE Trans. Mag.*, 2000, 36:538-544.
Borisov et al., "Magnetoelectric Switching of Exchange Bias," *Phys. Rev. Lett.*, 2005, 94:117203, 5 pages.
Chen and Yan, "Main characteristics of a Brayton refrigeration cycle of paramagnetic salt," *J. Appl. Phys.*, 1994, 75:1249.

(Continued)

*Primary Examiner* — Emmanuel Duke
(74) *Attorney, Agent, or Firm* — Fish & Richardson P.C.

(57) ABSTRACT

A method for refrigeration through voltage-controlled entropy change includes applying a voltage signal to a piezoelectric material to generate strain in the piezoelectric material, generating strain in a magnetic material attached to the piezoelectric material, and generating a change in a temperature of the magnetic material in response to the strain in the magnetic material.

27 Claims, 4 Drawing Sheets

(56) References Cited

OTHER PUBLICATIONS

Eerenstein et al., "Multiferroic and magnetoelectric materials," *Nature*, 2006, 442:759-765.

Gschneidner Jr. et al., "Recent developments in magnetocaloric materials," *Rep. Prog. Phys.*, 2005, 68:1479-1539.

He et al., "Robust isothermal electric control of exchange bias at room temperature," *Nature Mater.*, 2010, 9:579-585.

Lu et al., "Electric modulation of magnetization at the $BaTiO_3$/$La_{0.67}Sr_{0.33}MnO_3$ interfaces," *Appl. Phys. Lett.*, 2012, 100:232904, 7 pages.

Ma et al., "Recent Progress in Multiferroic Magnetoelectric Composites: from Bulk to Thin Films," *Adv. Mater.*, 2011, 23:1062-1087.

Michalski et al., "Magnetic entropy changes in nanogranular $Fe:Ni_{61}Cu_{39}$," *J. Appl. Phys.*, 2011, 109:07A936, 5 pages.

Mukherjee et al., "Spin and elastic contributions to isothermal entropy changes," *J. Appl. Phys.*, 2012, 111:07A931, 4 pages.

Mukherjee et al., "Magnetocaloric properties of Co/Cr superlattices," *Phys. Rev. B*, 2009, 79:144406.

Mukherjee et al., "Overcoming the spin-multiplicity limit of entropy by means of lattice degrees of freedom: A minimal model," *Phys. Rev. B*, 2011, 83:214413.

Pecharsky and Gschneidner Jr., "Advanced magnetocaloric materials: What does the future hold?" *Int. J. Refrig.*, 2006, 29:1239-1249.

Pecharsky and Gschneidner Jr., "Magnetocaloric effect and magnetic refrigeration," *J Magn Magn Mater.*, 1999, 200:44-56.

Pecharsky and Gschneidner, Jr., "Giant Magnetocaloric Effect in $Gd_5(Si_2Ge_2)$," *Phys. Rev. Lett.*, 1997, 78:4494.

Pecharsky et al., "The giant magnetocaloric effect of optimally prepared $Gd_5Si_2Ge_2$," *J. Appl. Phys.*, 2003, 93:4722.

Polisetty et al., "Piezoelectric tuning of exchange bias in a $BaTiO_3$/Co/CoO heterostructure," *Phys. Rev. B*, 2010, 82:134419.

Provenzano et al., "Reduction of hysteresis losses in the magnetic refrigerant $Gd_5Ge_2Si_2$ by the addition of iron," *Nature*, 2004, 429:853.

Pyatakov and Zvezdin, "Magnetoelectric and multiferroic media," *Phys. Usp.* 2012, 55:557.

Richard et al., "Magnetic refrigeration: Single and multimaterial active magnetic regenerator experiments," *J. Appl. Phys.*, 2004, 95:2146-2150.

Russek and Zimm, "Potential for cost effective magnetocaloric air conditioning systems," *Int. J. Refrig.*, 2006, 29:1366-1373.

Sahoo et al., "Ferroelectric control of magnetism in $BaTiO_3$/Fe heterostructures via interface strain coupling," *Phys. Rev. B*, 2007, 76:092108, 6 pages.

Salamon and Chun, "Griffiths singularities and magnetoresistive manganites," *Phys. Rev. B*, 2003, 68:014411.

Scott, "Electrocaloric Materials," *Annu Rev Mater Res.*, 2011, 41:229.

Skomski et al., "Entropy localization in magnetic compounds and thin-film nanostructures," *J. Appl. Phys.*, 2010, 107:09A922, 5 pages.

Thiele et al., "Voltage-controlled epitaxial strain in $La_{0.7}Sr_{0.3}MnO_3$/$Pb(Mg_{1/3}Nb_{2/3})O_3$-$PbTiO_3$(001) films," *Appl. Phys. Lett.*, 2005, 87:262502.

Thiele et al., "Influence of strain on the magnetization and magnetoelectric effect in $La_{0.7}A_{0.3}MnO_3$/PMN-PT(001) (A=Sr,Ca)," *Phys. Rev. B*, 2007, 75:054408.

Wada and Tanabe, "Giant magnetocaloric effect of $MnAs_{1-x}Sb_x$," *Appl. Phys. Lett.*, 2001, 79:3302.

Wang et al., "Electric Control of Magnetism at Room Temperature," *Sci. Rep.*, 2012, 2:223.

Wood and Potter, "General Analysis of Magnetic Refrigeration and its Optimization Using a New Concept: Maximization of Refrigerant Capacity," *Cryogenics*, 1985, 25:667.

Yang et al., "Electron spin resonance study of polycrystalline $La_{0.75}(Ca_xSr_{1-x})_{0.25}MnO_3$ (x=0, 0.45, 1)," *J. Phys.: Condens. Matter*, 2009, 21:046002.

Ziese et al., "Coupled Magnetic and Structural Transitions in $La_{0.7}Sr_{0.3}MnO_3$ Filsm on $SrTiO_3$," *New J. Phys.*, 2008, 10:063024.

Zimm et al., "Design and performance of a permanent-magnet rotary refrigerator," *Int. J. Refrig.*, 2006, 29:1302-1306.

\* cited by examiner

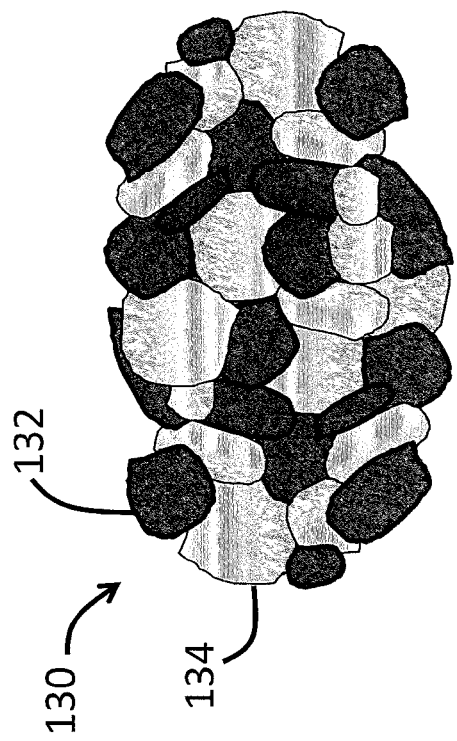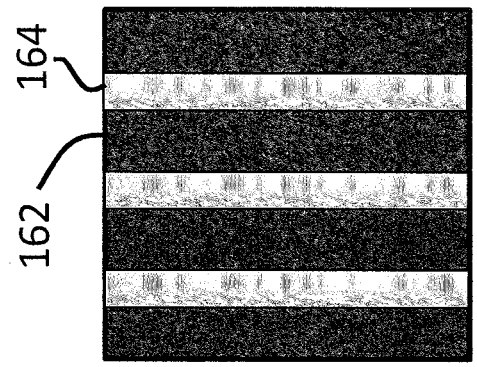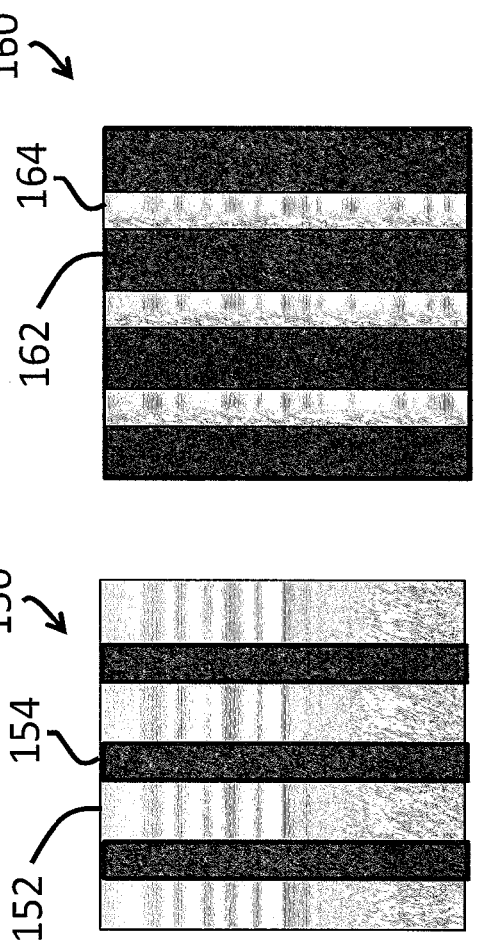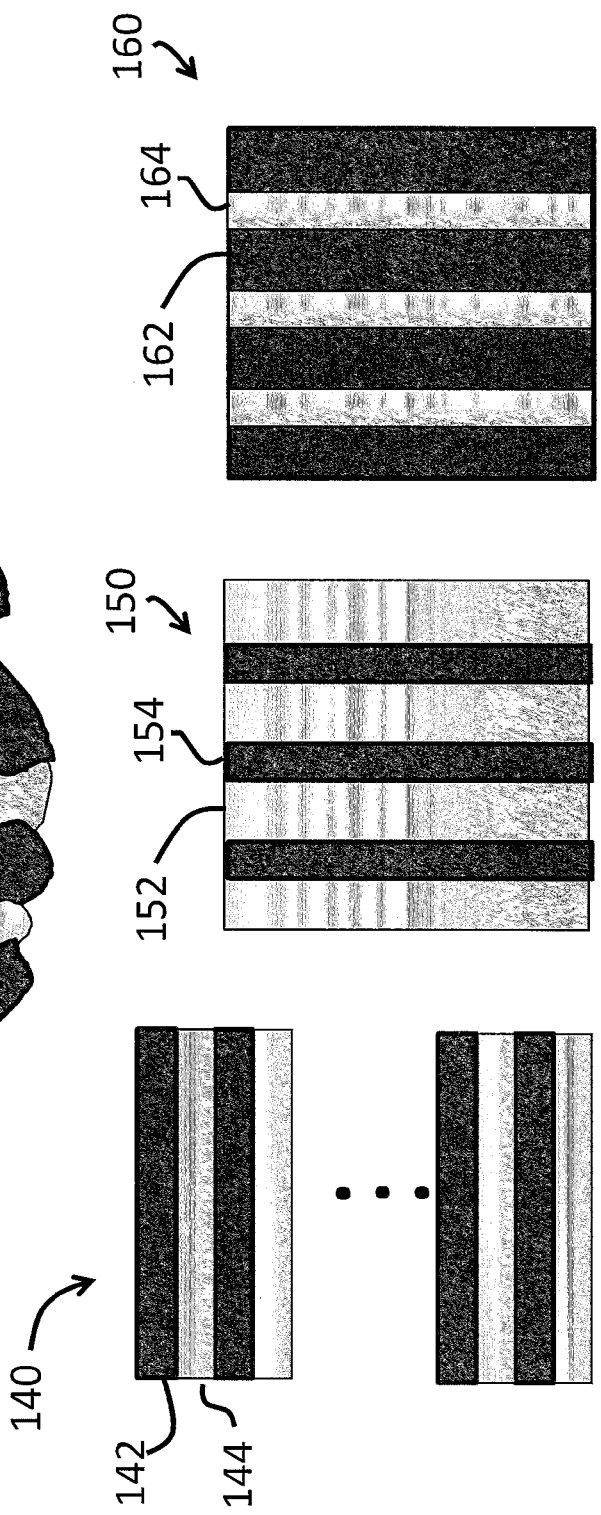

REFRIGERATION THROUGH VOLTAGE-CONTROLLED ENTROPY CHANGE

CROSS-REFERENCE TO RELATED APPLICATIONS

This application claims priority under 35 USC §119(e) to U.S. Patent Application Ser. No. 61/667,472, filed on Jul. 3, 2012, the entire content of which is hereby incorporated by reference.

BACKGROUND

According to U.S. Energy Information Administration, heating, ventilation, and cooling (HVAC) accounted for 3,856 billion kWh, or 36 percent of the electricity consumed by U.S. households in 2011. Central air-conditioning and refrigeration alone accounted for 30 percent of the total electricity used in homes. Improved refrigeration technology is of major importance and, potentially, a big part of the solution to the energy crisis.

There are several refrigeration technologies, such as vapor-compression refrigeration and magnetic refrigeration. In some implementations, magnetic refrigeration uses the magnetocaloric effect in which an active magnetocaloric material is exposed to an external magnetic field. The isothermal entropy change and the adiabatic temperature change are two important parameters that characterize and quantify the magnetocaloric effect. An integrated Maxwell relation determines the isothermal entropy change, $\Delta S$. The Maxwell relation that originates from the analytic properties of the Gibbs free energy can be expressed as follows:

$$\Delta S = \mu_0 V \int_{H_i}^{H_f} \frac{\partial M}{\partial T} dH, \qquad \text{(Equ. 1)}$$

where $H_{i,f}$ are the initial (typically zero) and final applied magnetic field, M is the magnetization, V is the volume of the active magnetocaloric material, and $\mu_0$ is the vacuum permeability. Equation 1 is valid in situations where the mixed second-order derivatives of the Gibbs free energy exist and the order of differentiation can be exchanged. This is the case in general, with the exception of first-order phase transitions, where the entropy change at the transition can be calculated with the help of the Clausius-Clapeyron equation.

SUMMARY

In one aspect, in general, a method of changing temperature through voltage-controlled entropy change is provided. The method includes applying a voltage signal to a piezoelectric material to generate strain in the piezoelectric material; generating strain in a magnetic material attached to the piezoelectric material; and generating a change in a temperature of the magnetic material in response to the strain in the magnetic material.

Implementations of the method may include one or more of the following features. Applying a voltage signal can include applying an alternating voltage signal. Applying the alternating voltage signal can include applying a first voltage to the piezoelectric material to induce a first strain to cause a reduction in the temperature of the magnetic material, and applying a second voltage to the piezoelectric material to induce a second strain to cause an increase in the temperature of the magnetic material. The method can include using the magnetic material to absorb heat from a first object after the temperature of the magnetic material is reduced, and transferring heat from the magnetic material to a second object after the temperature of the magnetic material is increased. Generating a change in the temperature can include reducing the temperature of the magnetic material. Generating a strain in a magnetic material can include generating a strain in a La—Sr—Mn—O compound. The piezoelectric material can have a grain structure, the magnetic material can have a grain structure, and the piezoelectric material and the magnetic material can be mixed and in contact with each other. The piezoelectric material can be configured as a thin film, the magnetic material can be configured as a thin film, and the thin film of piezoelectric material and the thin film of magnetic material can be in contact and form a layered structure. The piezoelectric material can be configured as columns that are surrounded by the magnetic material. The magnetic material can be configured as columns that are surrounded by the piezoelectric material.

In another aspect, in general, an apparatus for changing temperature through voltage-controlled entropy change includes a piezoelectric material; a magnetic material in contact with the piezoelectric material; and a voltage signal generator to provide a voltage signal to the piezoelectric material to induce strain in the piezoelectric material, which induces strain in the magnetic material, which in turn induces a change in a temperature of the magnetic material.

Implementations of the apparatus may include one or more of the following features. The voltage signal generator can be configured to generate a voltage signal having a voltage level that changes periodically. The piezoelectric material can be configured to respond to the voltage signal by periodically stretching and relaxing, or compressing and relaxing. The apparatus can include an actuator to cause the magnetic material to alternately move between a first position and a second position. The actuator can cause the magnetic material to move to the first position when the magnetic material is at a relatively lower temperature, and cause the magnetic material to move to the second position when the magnetic material is at a relatively higher temperature. The magnetic material can include a ferromagnetic material. The magnetic material can include a magnetocaloric material, the magnetic material can include a La—Sr—Mn—O compound. The piezoelectric material can have a grain structure, the magnetic material can have a grain structure, and the piezoelectric material and the magnetic material can be mixed and in contact with each other. The piezoelectric material can include a thin film of piezoelectric material, the magnetic material can include a thin film of magnetic material, and the thin film of piezoelectric material and the thin film of magnetic material can be in contact and form a layered structure. The piezoelectric material can include columns of piezoelectric material that are surrounded by the magnetic material. The magnetic material can include columns of magnetic material that are surrounded by the piezoelectric material. The magnetic material and the piezoelectric material can be tightly bonded to each other.

In another aspect, in general, a cooling device includes a first material that induces strain upon application of a voltage signal, in which a level of the strain varies in response to changes in the voltage signal; a second material coupled to the first material, in which strain is induced in the second material when the strain is induced in the first material, and in which an entropy and a temperature of the second material change when the strain is induced in the second material; and a voltage signal generator to provide the voltage signal, in which the voltage signal is configured to cause the second material to vary between higher and lower temperatures.

Implementations of the cooling device may include one or more of the following features. The first material can include a piezoelectric material. The second material can include a magnetic material. The second material can include a ferromagnetic material. The second material can include a magnetocaloric material. The magnetic material can include a La—Sr—Mn—O compound. The voltage signal generator can be configured to generate a voltage signal having a voltage level that changes periodically. The cooling device can include an actuator to cause the second material to alternately move between a first position and a second position. The actuator can cause the second material to move to the first position when the second material is at a relatively lower temperature, and cause the second material to move to the second position when the second material is at a relatively higher temperature. When the second material is at the first position, heat can flow from a first object or region to the second material, and when the material is at the second position, heat can flow from the second material to a second object or region. The first and second materials can have grain structures, and the first and second materials can be mixed and in contact with each other. The first material can be configured as a first thin film, the second material can be configured as a second thin film, and the first and second thin films can form a layered structure. The first material can be configured as columns that are surrounded by the second material. The second material can be configured as columns that are surrounded by the first material. The first and second materials can be tightly bonded to each other.

The techniques described herein may have one or more of the following advantages. Modifying temperature of an object, such as cooling the object, can be achieved by applying a voltage signal and without applying a magnetic field. A device for changing temperature through voltage-controlled entropy change can be made compact and suitable for portable devices.

Other features and advantages are apparent from the following description and from the claims.

BRIEF DESCRIPTION OF DRAWINGS

FIGS. 3A to 3D are diagrams of suggested nanofabrication of magnetocaloric materials for voltage-controlled entropy change.

DETAILED DESCRIPTION

In the past, researchers conducting research on magnetic field-induced caloric effects have focused on finding optimized magnetocaloric materials. Based on Equation 1, one way to obtain large entropy change is to have a large change in magnetic field. This can be achieved by moving a magnetic material in and out of a strong magnetic field generated by a permanent magnet. The inventor recognized that Equation 1 misleadingly suggests that the use of an external magnetic field is mandatory in order to achieve a sizeable isothermal entropy change. The description below shows that applied magnetic fields are not necessary to utilize the magnetocaloric effect. In addition, voltage-induced entropy change in magnetocaloric materials has significant advantages over conventional magnetic field-induced entropy change with the potential to revolutionize magnetic refrigeration technology. It is beneficial to combine the advantages of magnetocaloric and electrocaloric materials by utilizing the magnetocaloric effect through pure voltage control.

The following describes advantage of voltage-control over magnetic field-induced entropy change. The ordinary path towards sizable isothermal entropy change relies on applying magnetic fields to ever higher final values, $H_f$, until technical saturation of the magnetization is reached. This brute-force approach has practical limitations. When relying on the maximum achievable flux densities of 1-2 Tesla of modern permanent magnets (e.g., Nd—Fe—B or Sm—Co), the feasible adiabatic temperature changes remain below 10 K. Permanent magnetic flux densities of the order of 4 Tesla can be generated in Halbach cylinders, but logarithmic dependence of the field on the diameter of the cylinder makes such devices very heavy. Because permanent magnets can generate magnetic fields in an energy efficient manner, most of today's realizations of magnetocaloric refrigerators utilize a mechanism that moves the magnetocaloric material relative to the permanent magnet in order to create a sizable change in magnetic field, $\Delta H = H_f - H_i$. The moving parts may generate noise, losses in friction, and wear-and-tear of components. The disadvantages of magnetic field-induced entropy changes can be avoided when employing voltage-controlled entropy change in the absence of electric currents.

Figure 1:
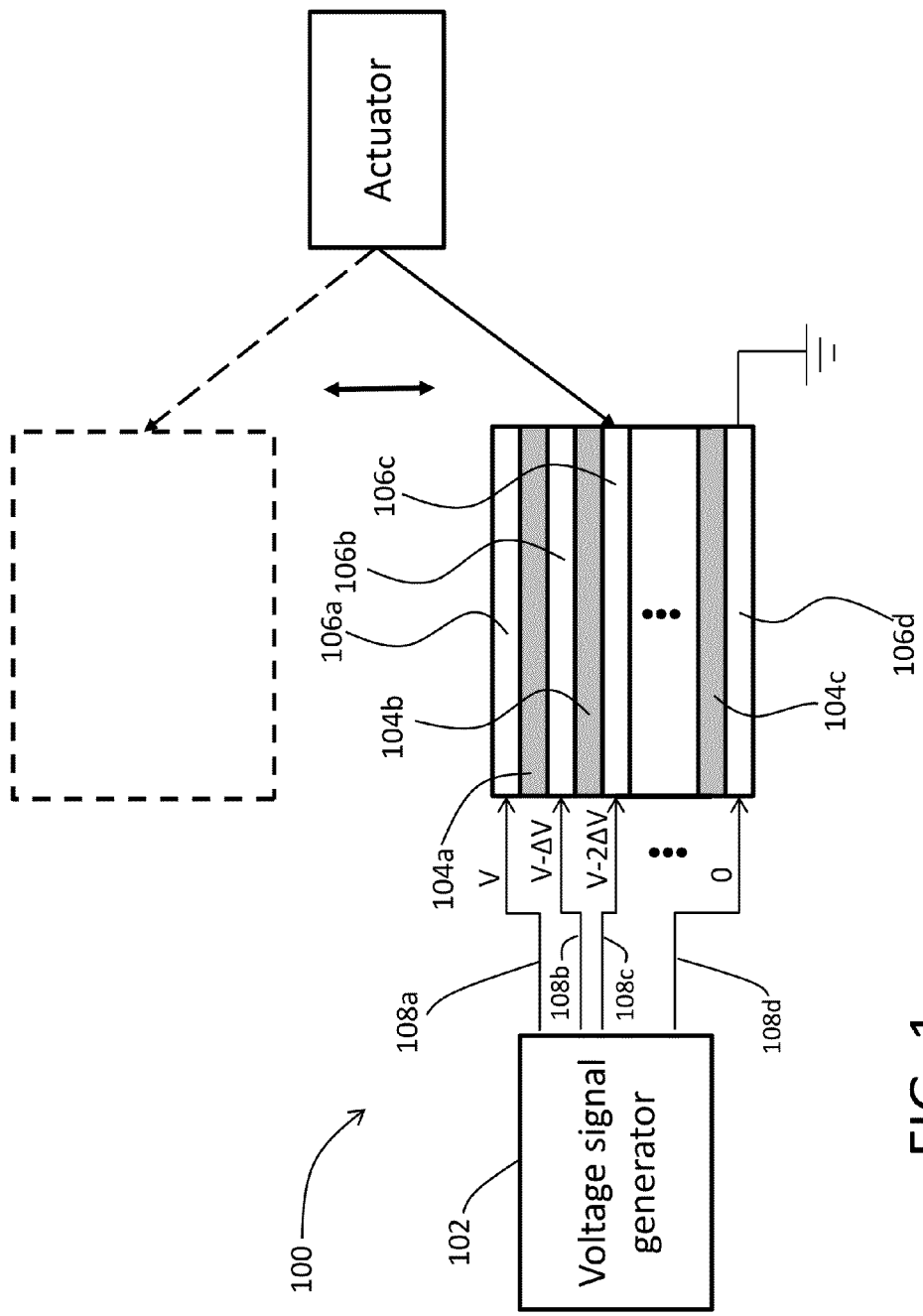
FIG. 1 is a diagram of a cooling device.

Referring to FIG. 1, in some implementations, near-room-temperature refrigeration through voltage-controlled entropy change can be achieved using a cooling device 100 that includes a voltage signal generator 102 that provides one or more voltage signals to generate an electric field across piezoelectric thin films 104a, 104b, 104c (collectively 104). Attached to the piezoelectric thin films 104 are ferromagnetic thin films 106a, 106b, 106c (collectively 106). In some examples, the ferromagnetic material is electrically conductive, and voltage signals 108a, 108b, 108c, . . . , 108d having voltage levels V, V−ΔV, V−2ΔV, . . . , 0, respectively, can be applied to the ferromagnetic thin films 106a, 106b, 106c, 106d, respectively, to generate electric fields across the piezoelectric thin films 104a, 104b, . . . , 104c. In this example, a voltage difference ΔV is applied across each piezoelectric thin film 106 in the thickness direction. Each piezoelectric thin film 106 has a small thickness d, and because E=ΔV/d, a relatively small voltage difference ΔV can generate a large electric field E across each piezoelectric thin film 104. In this configuration, the ferromagnetic thin films 106 are the active material (that changes temperature), and also function as the electric contacts for applying the voltage signals. Each piezoelectric thin film 104 is sandwiched between two electrodes, similar to a filled capacitor. The piezoelectric thin films 104 can be made of, e.g., $PbMg_{1/3}Nb_{2/3}O_3$—$PbTiO_3$(001) (PMN-PT), and the ferromagnetic thin films 106 can be made of, e.g., $La_{0.7}Sr_{0.3}MnO_3$ (referred to as LSMO or La—Sr—Mn—O compound).

In some implementations, a voltage signal V1 is applied to the top ferromagnetic layer 106a, and a voltage signal V2 is applied to the bottom ferromagnetic layer 106d. The voltage difference V1−V2=ΔV generates an electric field between the top and bottom ferromagnetic layers 106, in which the electric field is applied across the piezoelectric thin films 104. In this example, the voltage signal generator 102 only needs to output two voltage signals having different voltage levels.

The voltage signal 108 can have, e.g., a sinusoidal waveform or a sawtooth waveform. The voltage signal 108 can have an alternating waveform having a voltage level that varies periodically. When the voltage signal 108 is applied to the thin films, strain is induced in the piezoelectric thin films 104. Because the ferromagnetic thin films 106 are attached to the piezoelectric thin films 104, the strain in the piezoelectric thin films 104 causes strain to be induced in the ferromagnetic thin films 106. When strain is induced in the ferromagnetic thin films 106, the magnetization of the ferromagnetic material changes, the entropy of the ferromagnetic thin films 106 changes, and the temperature of the ferromagnetic thin films 106 changes.

By controlling the voltage signal 108, the temperature of the ferromagnetic thin films 106 can be made to increase or decrease. For example, suppose the voltage signal 108 alternates between a high positive voltage level and zero. When the high voltage level is applied to the piezoelectric thin films 104, strain is induced in the piezoelectric thin films 104 and the ferromagnetic thin films 106, causing magnetization of the ferromagnetic thin films 106 to decrease (or increase depending on the bias strain the film has at zero voltage) from the original state (the state when no voltage is applied), thereby causing the entropy to increase in an isothermal situation and, in an adiabatic situation suitable for the refrigeration application, temperature to decrease. When the zero voltage level is applied to the piezoelectric thin films 104, strain is removed from in the piezoelectric thin films 104 and the ferromagnetic thin films 106, causing magnetization of the ferromagnetic thin films 106 to increase and return to the original state, thereby causing the entropy to decrease and temperature to increase.

For example, each of the LSMO thin films can have a thickness in the order of a few nanometers to tens of nanometers, e.g., 20 nm. An advantage of using LSMO thin films instead of LSMO bulk material is that strain can be induced in a large portion (e.g., the entire portion) of the LSMO thin film, which increases the magnetocaloric effect, resulting in a larger temperature change. If LSMO bulk material is used, strain is induced only near the surface of the LSMO material that is in contact with the piezoelectric material so that the magnetocaloric effect is smaller (for a given amount of LSMO material).

The following describes the mechanism for realization of voltage-activated entropy change using the magnetocaloric effect. In some implementations, piezoelectrically-induced strain can be used to control anisotropy and critical temperature of magnetic materials. For example, piezoelectrically-induced strain can be used to substantially change the magnetic anisotropy in iron (Fe) thin films or used to control the exchange-bias field in an exchange-bias magnetic heterostructure. Similarly, strain originating from stress can be induced via the inverse piezoelectric effect. The strain, when carried over into an adjacent magnetic thin film, can substantially change the magnetic Curie temperature, $T_C$ of the magnetic material. An external control parameter such as tensile or compressive strain can tune the degree of magnetic order in a magnetically long-range ordered system. Decrease (increase) in long-range magnetic order can be accompanied by a significant increase (decrease) in entropy. The transition from a paramagnetic into a long-range ordered magnetic state is accompanied by sizeable entropy reduction.

For example, a compressively strained $La_{0.7}Sr_{0.3}MnO_3$ (LSMO) film of 16 nm thickness on $LaAlO_3$ (001) changes the Curie temperature of the former from 365 K (unstrained) to 270 K (strained through lattice mismatch). Voltage-controlled epitaxial strain in LSMO can be achieved when exploiting the inverse piezoelectric effect of $PbMg_{1/3}Nb_{2/3}O_3$—$PbTiO_3$(001) (PMN-PT) substrates. When the temperature of a permanent magnet increases above a certain point, referred to as the Curie temperature, the permanent magnetism changes to paramagnetism. For a given temperature, the magnetization of the LSMO film increases when an electric field is applied to the compressively strained $La_{0.7}Sr_{0.3}MnO_3$ (LSMO) film on $LaAlO_3$ (001). In addition, when an electric field is applied to the compressively strained $La_{0.7}/Sr_{0.3}MnO_3$ (LSMO) film on $LaAlO_3$ (001), the Curie temperature (or critical temperature) in the LSMO film tends to increase. Various parameters allow fine-tuning of the critical temperature at zero applied voltage. The tuning parameters include the Sr concentration of the LSMO compound, the film thickness, and the initial strain in zero-applied electric field.

Changes of the critical temperature, $T_C$, of ferromagnetic thin films such as the complex oxide LSMO can be achieved by pure voltage-control, in which the inverse piezoelectric effect is used in order to strain the LSMO film in an electrically controlled manner. Large magnetoelectric susceptibilities can be achieved, e.g., in complex oxides, when using the electric field effect. For example, sizable electric modulation of magnetization in a $BaTiO_3$/LSMO heterostructure can be achieved. The electric field-controlled metal-insulator transition in the LSMO film produces a large magnetoelectric effect that can be used in the same way as the strain-induced change in magnetization.

The following describes thermodynamic consequences of large magnetoelectric effects and their impact on voltage-controlled isothermal entropy change. Theoretical basis for the voltage-controlled entropy change is described below. The differential form of the Helmholtz free energy, F, of a magnetic system, can be represented as follows:

$$dF = SdT + \mu_0 VHdM. \quad \text{(Equ. 2)}$$

When the applied magnetic field is zero, the variable H in Equation 2 can be considered to be the internal magnetic field, which depends on temperature T and the equilibrium magnetization M. The magnetization in turn is a function of a control parameter, which in this case is the electric field E. Therefore, the equation of state can be written as $$H = H(T, M(E)). \quad \text{(Equ. 3)}$$

From Equation 2, we derive a Maxwell relation by identifying the mixed second-order derivatives of the Helmholtz free energy:

$$\left(\frac{\partial S}{\partial M}\right)_T = -\mu_0 V \left(\frac{\partial H}{\partial T}\right)_M. \quad \text{(Equ. 4)}$$

Integration of Equation 4 provides the expression:

$$\Delta S = -\mu_0 V \int_{M_i}^{M_f} \left(\frac{\partial M}{\partial T}\right)_M dM, \quad \text{(Equ. 5)}$$

for the isothermal entropy change. Note that Equation 5 differs from Equation 1, which is derived from a different Maxwell relation originating from the Gibbs free energy.

Using thermodynamic identities, $$\left(\frac{\partial H}{\partial T}\right)_M \left(\frac{\partial M}{\partial H}\right)_T \left(\frac{\partial T}{\partial M}\right)_H = -1,$$

we get $$\left(\frac{\partial H}{\partial T}\right)_M = -\frac{1}{\chi}\left(\frac{\partial M}{\partial T}\right)_H,$$

which leads after substitution into Equation 5 a formula for the isothermal entropy change:

$$\Delta S = \int_{M_i}^{M_f} \frac{\mu_0 V}{\chi}\left(\frac{\partial M}{\partial T}\right)_H dM, \quad \text{(Equ. 6)}$$

where $$\chi = \left(\frac{\partial M}{\partial H}\right)_T$$

is the magnetic susceptibility. From the fact that M depends on the control parameter, E, we substitute $$dM = \left(\frac{\partial M}{\partial E}\right)_T dE$$

to obtain $$\Delta S = \int_{E_i=0}^{E_f} \frac{\mu_0 V}{\chi}\left(\frac{\partial M}{\partial T}\right)_H \left(\frac{\partial M}{\partial E}\right)_T dE. \quad \text{(Equ. 7)}$$

The following describes numerical estimates for voltage-controlled entropy change in a heterostructure that includes a piezoelectric material PMN-PT and a magnetocaloric material LSMO. The values of the parameters can be estimates or values based on experiment data. To further explore the consequences of Equation 7, we consider the Landau expression $$F = F_0(T) + \frac{1}{2}AM^2 + \frac{1}{4}BM^4 - \mu_0 VHM.$$

Here, $A = a_0(T - T_C(E))$, $a_0$ and B are positive constants, and $F_0$ is a regular temperature-dependent background. The Landau expression allows specifying M and $\chi$ in terms of the expansion coefficients. This yields the entropy change for $T \leq T_C(0)$ $$\Delta S = -\frac{a_0^2}{2B}(T_C(E) - T_C(0)) \quad \text{(Equ. 8)}$$

One can replace the parameters of the Landau expansion using $$\frac{a_0}{B} = \frac{M^2(T=0)}{T_c} \quad \text{and} \quad \frac{\mu_0 V}{\chi(2T_c)} = a_0 T_C$$

which yields $$\Delta S = -\frac{\mu_0 V M^2(T=0)}{2\chi(2T_c)T_c^2}(T_C(E) - T_C(0)). \quad \text{(Equ. 9)}$$

For example, using a density value for LSMO of $\rho = 6600$ kg/m$^3$, we calculate a mass-specific isothermal entropy change which can now be used for comparison with current state-of-the-art magnetic field-induced, specific entropy changes. For example, the saturation magnetization of a pulsed laser deposited LSMO film of 30% Sr concentration can be M(T=0)$\approx$−0.45 MA/m. We use the mean-field expression, $$\frac{\mu_0 M(0)}{\chi(T)} = \frac{3k_B T_C}{g\mu_B(S+1)}\left(\frac{T}{T_C} - 1\right), \quad \text{(Equ. 10)}$$

which for $T = 2T_C$ yields $$\chi(2T_c) = \frac{\mu_0 g \mu_B (S+1) M(0)}{3k_B T_C},$$

where $S \approx 3.5$. Using further a Landé g-factor of $g \approx 2$ in accordance with Ref.($^i$), $T_C(E=0) = 279$K and $\Delta T_C = T_C(E=7$ kV/cm$) - T_C(0) = 19$ K, we estimate the value of the specific entropy change, which yields $$\Delta S/m = -1.15 \frac{J}{kgK}.$$

Note that S(T,E) and, therefore, Equation 8 can be directly calculated from the Landau free energy according to $$S = -\left(\frac{\partial F}{\partial T}\right)_M.$$

This yields $$S(T, E) = -\left(\frac{\partial F}{\partial T}\right)_M = \quad \text{(Equ. 11)}$$

$$-\frac{1}{2}\frac{\partial A}{\partial T}M^2 + S_0 = \begin{cases} -\frac{a_0^2}{2B}(T_C(E) - T) + S_0 & \text{for } T < T_C(E) \\ S_0 & \text{for } T > T_C(E) \end{cases}$$

Equations 7 and 11 are both useful. Equation 7 is free from approximations. Also, $\chi$ and M(T,E) can be measured while the Landau free energy is a crude approximation of the underlying thermodynamic potential F and may not be experimentally accessible.

Alternatively, we estimate the mass-specific isothermal entropy change at T=280 K from the magnetoelectric susceptibility, $$\alpha = \mu_0 \frac{\partial M}{\partial E},$$

of PMN-PT/LSMO. The numerical value of $\alpha$ is determined from the data adapted from C. Thiele, K. Dörr, O. Bilani, J.

Rödel, and L. Schultz, Phys. Rev. B 75, 054408 (2007). For E=0 and 7 kV/cm the magnetization data can be described by the functions $$M(T, E = 0) = 10^4 \sqrt{(2.63 \times 10^3 - 9.27 \text{ T/K})} \frac{A}{m} \text{ and } M(T, E = 7 \text{ kV/cm}) = 10^4 \sqrt{(3.24 \times 10^3 - 10.89 \text{ T/K})} \frac{A}{m}$$

which yields $$\alpha(T = 280 \text{ K}) \approx \mu_0(M(T = 280K, E = 7 \text{ kV/cm}) - M(T = 280K, E = 0))/ (7.0 \times 10^5 \text{ V/m}) = 2.41 \times 10^{-7} \frac{s}{m}.$$

We use this value of magnetoelectric susceptibility for further estimates and neglect the details of the temperature dependence of $\alpha$. We use a rough estimate for $$M(0) = 0.51 \times 10^6 \frac{A}{m}$$

for LSMO by extrapolating M(T,E=0) towards T=0. The extrapolation of the Landau expression overestimates the magnetization at T=0 which, in turn, gives rise to an underestimation of the isothermal entropy change. We obtain $$\left(\frac{\partial M}{\partial T}\right)_{T=280K, E=0} = -8.53 \frac{kA}{mK}$$

from the M (T,E=0) function. We assume a linear dependence of $T_C$ on the applied electric field which reads $T_C(E)=2.43 \times 10^{-5}$ E Km/V+280 K. Using Equation 10 to quantify $\chi(T,T_C(E))$, we estimate the mass-specific isothermal entropy change from $$\Delta S/m = \int_0^E \frac{\alpha}{\chi(T, T_C)\rho} \left(\frac{\partial M}{\partial T}\right)_H dE. \quad \text{(Equ. 12)}$$

It yields $$\Delta S/m = -1.43 \frac{J}{kgK}$$

in good agreement with the alternative approach based on Equation 9 and outlined above. The remaining difference in the numerical values of the specific isothermal entropy changes originates from differences in the assumptions and approximations. Equation 12 shows that entropy change can be achieved without applying a magnetic field.

The following describes refrigerant capacity and implications for refrigeration applications. The voltage-induced entropy change estimated above is of respectable magnitude when compared, e.g., with the bulk giant magnetocaloric material $Gd_5Si_2Ge_2$, which represents a benchmark for magnetocaloric materials. $Gd_5Si_2Ge_2$ has an isothermal entropy change of approximately 4 J/kgK when an external magnetic field is ramped from zero to 1 Tesla. Although this value is still approximately twice the entropy change we estimate for the voltage-controlled effect in PMN-PT/LSMO, it is important to realize that for virtually all magnetocaloric materials and $Gd_5Si_2Ge_2$ in particular, the isothermal entropy change strongly peaks at a given temperature, $T_{max}$, and decreases for both higher and lower temperatures. This limits the refrigerant capacity (RC), which is the figure-of-merit of a refrigerator. The refrigerant capacity can be calculated from the temperature-dependence of the isothermal entropy change according to $$RC = \int_{T_{max}-\Delta T/2}^{T_{max}+\Delta T/2} \Delta S dT.$$

Here $\Delta T$ is the width of $\Delta S(T)$ at half-maximum. Therefore, for the narrow Gaussian S vs. T behavior, the refrigerant capacity is limited despite potentially large values of S at the maximum of S vs. T.

In the case of voltage-controlled entropy change, S vs. T will remain virtually constant for all $T<T_C(0)$ at the value given by Equation 9. The absolute value of the entropy change decreases linearly to zero for $T>T_C(0)$ and remains zero for $T \geq T_C(E)$.

Figure 2:
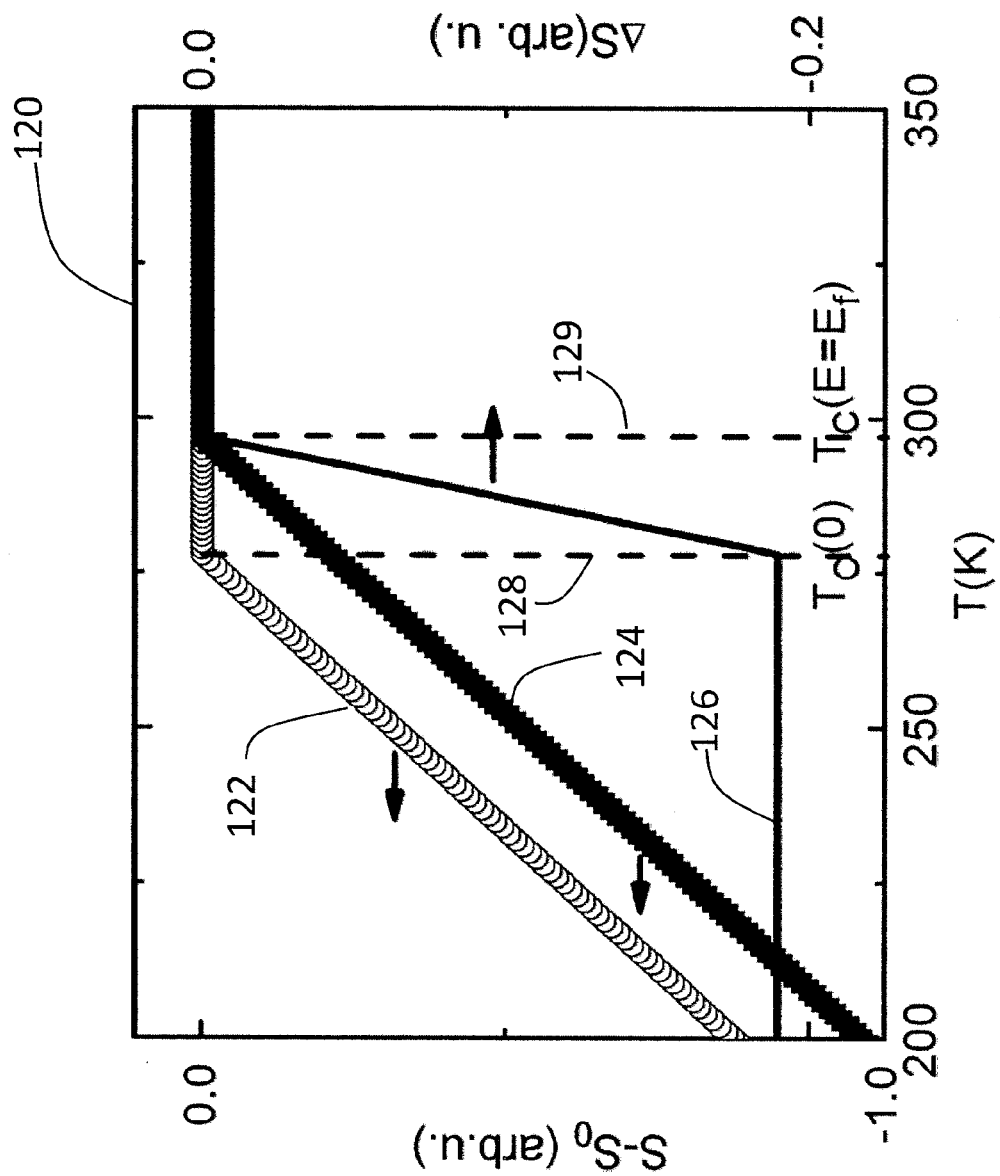
FIG. 2 is a graph showing the temperature dependence of the entropy with and without an electric field.

Referring to FIG. 2, a graph 120 shows the temperature dependencies of S(T,E=0) (circles, left axis), $S(T,E=E_f>0)$ (squares, left axis) and $\Delta(S(T,E=E_f>0)-S(T,E=0))$ (right axis) as given by Equation 11. Data points 122 (circles) represent the entropy S relative to a reference value $S_0$ for various temperatures when no electric field is applied (E=0). Data points 124 (squares) represent the entropy S relative to the reference value $S_0$ for various temperatures when an electric field is applied ($E=E_f>0$).

Dashed line 128 indicates the critical temperature $T_C(0)$ of the ferromagnetic film in electric field E=0. Dashed line 128 indicates the critical temperature $T_C(E=E_f)$ of the ferromagnetic film in electric field $E=E_f$. The line 126 shows $\Delta S$, which is the difference between the entropy value when voltage is applied, and the entropy value when a voltage is applied. The line 126 (right axis) shows the temperature dependence of the isothermal entropy change. The line 126 indicates that a significant difference in entropy $\Delta S$ exists ($|\Delta S| \approx 0.19$) for a wide range of temperature values, e.g., from less than 200K to about 278K. This indicates that the cooling device 100 can be used for cooling for a wide range of temperatures. The absolute value of the entropy difference $|\Delta S|$ decreases from about 0.19 to 0 when the temperature increases from about 278K to about 298K. This indicates that the cooling device 100 is useful for room temperature cooling applications.

The temperature independence of S vs. T for the temperatures $T<T_C(0)$ largely increases the refrigerant capacity to values potentially much higher than those reported in the literature. The emphasis here is to achieve sizeable entropy change in the absence of applied magnetic fields. Pure voltage-controlled entropy change broadens the range of potential applications when compact cooling solutions with little to no mechanical vibrations are required.

The following describes realization of multiferroic materials for voltage-controlled entropy change. The bilayer system PMN-PT/LSMO shown in FIG. 1 can be considered a generic and prototypical building block of a two-phase multiferroic material, allowing for voltage-controlled entropy change. In general, composite materials combining a piezoelectric material with a magnetic material of sizeable magnetoelastic response or other sources of large magnetoelectric response in multiferroic systems near room temperature are capable of functioning as a potential candidate for voltage-controlled entropy change.

Another candidate of a magnetoelectric composite for magnetocaloric applications is a laminate composite of piezoelectric MN and amorphous FeCoSiB which can be fabricated by sputtering methodology and has a high magnetoelectric effect at room temperature. Operation of the laminate in alternating current (AC) mode at resonance frequency and in the presence of a small biasing magnetic field (order of the Earth's magnetic field) gives rise to $\alpha \approx 1.4 \; 10^{-7}$ s/m, which may prove suitable as an alternative to the complex oxide composites analyzed here in more detail.

The M-type hexaferrite $SrCo_2Ti_2Fe_8O_{19}$ shows a promising large magnetoelectric effect at room temperature, which is about 50 times higher than the maximum magnetoelectric susceptibility $\alpha \approx 4 \; 10^{-12}$ s/m of the archetypical magnetoelectric chromia. Although the bulk magnetoelectric susceptibility is orders of magnitude below the magnetoelectric response of LSMO and FeCoSiB composites, the bulk magnetoelectric multiferroics may be produced at a lower cost and can be alternatives to the composite materials that include nanolayers of LSMO.

Referring to FIGS. 3A to 3D, for applications in magnetocaloric refrigeration, macroscopic amounts of active material are used. Several fabrication strategies can be used. Referring to FIG. 3A, in some examples, a mixture 130 that includes grains of piezoelectric material 132 (e.g., PMN-PT) and grains of magnetic material 134 having magnetoelastic properties (e.g., LSMO) can be used. The grains of piezoelectric material 132 and grains of magnetic material 134 can be bonded together using an adhesive material.

Referring to FIG. 3B, in some examples, a thin film heterostructure 140 can be used. The thin film heterostructure 140 includes a large number of repetitions of a bilayer building block, in which each building block includes a layer of piezoelectric material 142 and a layer of magnetic material 144.

Referring to FIG. 3C, in some examples, a columnar structure of piezoelectric material in a magnetic matrix can be used. For example, an ordered nanostructured arrangement 150 such as nanopillars of magnetic material 152 in a piezoelectric matrix 154 can be used.

Referring to FIG. 3D, in some examples, a columnar structure of magnetic material in a piezoelectric matrix can be used. For example, an ordered nanostructured arrangement 160 such as nanopillars of piezoelectric material 162 in a matrix of magnetic material 164 can be used. Here, the optimum structural choice will be affected by additional constraints such as optimized thermal conductivity.

The concept of voltage-controlled entropy change in magnetocaloric materials for magnetic refrigeration applications has been described above. One of the key features of this approach is that the magnetocaloric effect is utilized without applying an external magnetic field. We estimate a specific isothermal voltage-controlled entropy change for the bilayer heterostructure PMN-PT/LSMO is larger than 1 J/kgK and serves as proof of principle for voltage-controlled magnetic refrigeration near room temperature.

Figure 4:
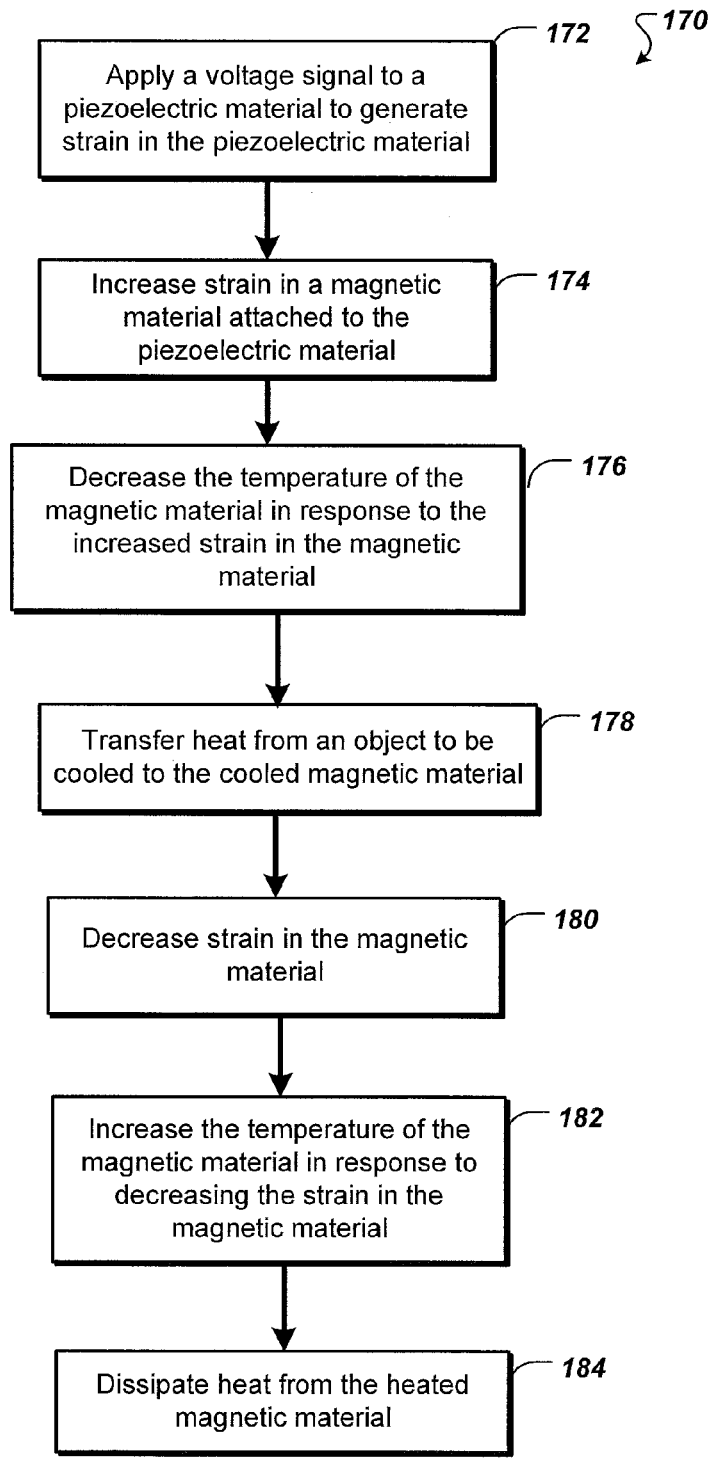
FIG. 4 is a flowchart of a process for cooling through voltage-controlled entropy change in multiferroics.

Referring to FIG. 4, a process 170 for cooling an object using voltage-controlled entropy change in multiferroics is provided. For example, the process 170 can be implemented using the cooling device 100 of FIG. 1. The process 170 includes applying a voltage signal to a piezoelectric material to generate strain in the piezoelectric material (172). The applied voltage increases strain in a magnetic material attached to the piezoelectric material (174). The temperature of the magnetic material is decreased in adiabatic response to the increased strain in the magnetic material (176). Heat is transferred from an object to be cooled to the cooled magnetic material (178). The voltage signal is modified to reduce the strain in the piezoelectric material, resulting in a decrease in the strain in the magnetic material (180). The temperature of the magnetic material is increased in response to the decrease of the strain in the magnetic material (182). Heat is dissipated from the heated magnetic material (184).

The foregoing description is intended to illustrate and not to limit the scope of the invention, which is defined by the scope of the appended claims. Other embodiments are within the scope of the following claims. For example, the thicknesses and the materials used for the piezoelectric thin films and the magnetic thin films can be different from those described above. The critical temperatures and the amount of entropy change in the materials can be different from those described above.

Instead of using a two-phase composite material having distinct piezoelectric material component and ferromagnetic material component, a magnetoelectrically active material in bulk compound form having a high magnetoelectric susceptibility can also be used. For example, the bulk compound may have piezoelectric grains mixed with ferromagnetic grains. The magnetoelectrically active material in bulk compound form can be made at a lower cost (compared to using the piezoelectric thin films and ferromagnetic thin films). When a voltage difference is applied to electrodes across the magnetoelectrically active material, an electric field is generated across the magnetoelectrically active material, causing the magnetization of the magnetoelectrically active material to change, and in an adiabatic situation causing the temperature of the magnetoelectrically active material to change.

FIG. 1, when the voltage signal is applied to generate strain, the magnetization in the magnetic material changes. In an isothermal situation, the entropy changes in response to the change in magnetization without a change in temperature, whereas in an adiabatic situation, the temperature changes without a change in entropy. It is also possible to have a combination of some entropy change and some temperature change in response to the change in magnetization. Thus, a cooling device made using the techniques described above can have a change in magnetization accompanied by a change in temperature without a change in entropy, or have a change in magnetization accompanied by both a change in temperature and a change in entropy.

In FIG. 1, as the voltage signal is applied to the combination of magnetic and piezoelectric thin films, the temperature of the thin films alternate between high to low levels. In some implementations, an actuator is used to cause the thin films to alternately move between a first position and a second position. In the first position, the thin films are in contact with, or in the vicinity of a first object to be cooled and absorbs heat from the first object. When the thin films are in the second position, the thin films are positioned away from the first object, and are in contact with, or in the vicinity of, a second object and dissipates heat to the second object. For example, the first object can be an electronic component that needs to be cooled, and the second object can be a heat sink or heat pipe. For example, the first object can be a first heat pump that transfers heat from a cooling chamber of a refrigerator to the thin films at the first position. The second object can be a second heat pump that transfers heat from the thin films in the second position to a heat dissipating apparatus, such as cooling fins. The movement of the thin films between the first and second positions is synchronized with the variation of voltage levels applied to the thin films. A controller may be used to control the actuator and the voltage signal generator so that they operate synchronously.

What is claimed is:

1. A cooling device, comprising: a first material that induces strain upon application of a voltage signal, in which a level of the strain varies in response to changes in the voltage signal; a second material coupled to the first material, in which strain is induced in the second material when the strain is induced in the first material, and in which an entropy and a temperature of the second material change when the strain is induced in the second material; a voltage signal generator to provide the voltage signal, in which the voltage signal is configured to cause the second material to vary between higher and lower temperatures; and an actuator to cause the second material to alternately move between a first position and a second position, and wherein the actuator causes the second material to move to the first position when the second material is at a relatively lower temperature, and causes the second material to move to the second position when the second material is at a relatively higher temperature.

2. The cooling device of claim 1 in which the first material comprises a piezoelectric material.

3. The cooling device of claim 1 in which the second material comprises a magnetic material.

4. The cooling device of claim 3 in which the second material comprises a ferromagnetic material.

5. The cooling device of claim 3 in which the second material comprises a magnetocaloric material.

6. The cooling device of claim 3 in which the magnetic material comprises a La—Sr—Mn—O compound.

7. The cooling device of claim 1 in which the voltage signal generator is configured to generate a voltage signal having a voltage level that changes periodically.

8. The cooling device of claim 1 in which when the second material is at the first position, heat flows from a first object or region to the second material, and when the second material is at the second position, heat flows from the second material to a second object or region.

9. The cooling device of claim 1 in which the first and second materials have grain structures, and the first and second materials are mixed and in contact with each other.

10. The cooling device of claim 1 in which the first material is configured as a first thin film, the second material is configured as a second thin film, and the first and second thin films form a layered structure.

11. The cooling device of claim 1 in which the first material is configured as columns that are surrounded by the second material.

12. The cooling device of claim 1 in which the second material is configured as columns that are surrounded by the first material.

13. The cooling device of claim 1 in which the first and second materials are tightly bonded to each other.

14. A method of cooling a device, the method comprising: applying a voltage signal to a first material to induce strain in the first material, in which the first material is selected to have a property such that the first material induces strain upon application of the voltage signal, and a level of the strain varies in response to changes in the voltage signal; inducing strain in a second material that is coupled to the first material; generating a change in an entropy and a temperature of the second material in response to the strain in the second material; and alternately moving the second material between a first position and a second position, and wherein alternately moving the second material between the first position and the second position comprises moving the second material to the first position when the second material is at a relatively lower temperature, and moving the second material to the second position when the second material is at a relatively higher temperature.

15. The method of claim 14 in which applying the voltage signal to the first material comprises applying the voltage signal to a piezoelectric material.

16. The method of claim 14 in which inducing the strain in the second material comprises inducing the strain in a magnetic material.

17. The method of claim 16 in which inducing the strain in the second material comprises inducing the strain in a ferromagnetic material.

18. The method of claim 16 in which inducing the strain in the second material comprises inducing the strain in a magnetocaloric material.

19. The method of claim 16 in which inducing the strain in the second material comprises inducing the strain in a La—Sr—Mn—O compound.

20. The method of claim 14 in which applying the voltage signal comprises applying an alternating voltage signal having a voltage level that changes periodically.

21. The method of claim 20 in which applying the alternating voltage signal comprises applying a first voltage to the first material to induce a first strain to cause a reduction in the temperature of the second material, and applying a second voltage to the first material to induce a second strain to cause an increase in the temperature of the second material.

22. The method of claim 14, comprising flowing heat from a first object or region to the second material when the second material is at the first position, and flowing heat from the second material to a second object or region when the second material is at the second position.

23. The method of claim 14 in which the first and second materials have grain structures, and the first and second materials are mixed and in contact with each other.

24. The method of claim 14 in which the first material is configured as a first thin film, the second material is configured as a second thin film, and the first and second thin films form a layered structure.

25. The method of claim 14 in which the first material is configured as columns that are surrounded by the second material.

26. The method of claim 14 in which the second material is configured as columns that are surrounded by the first material.

27. The method of claim 14 in which the first and second materials are tightly bonded to each other.

* * * * *